UNITED STATES PATENT OFFICE.

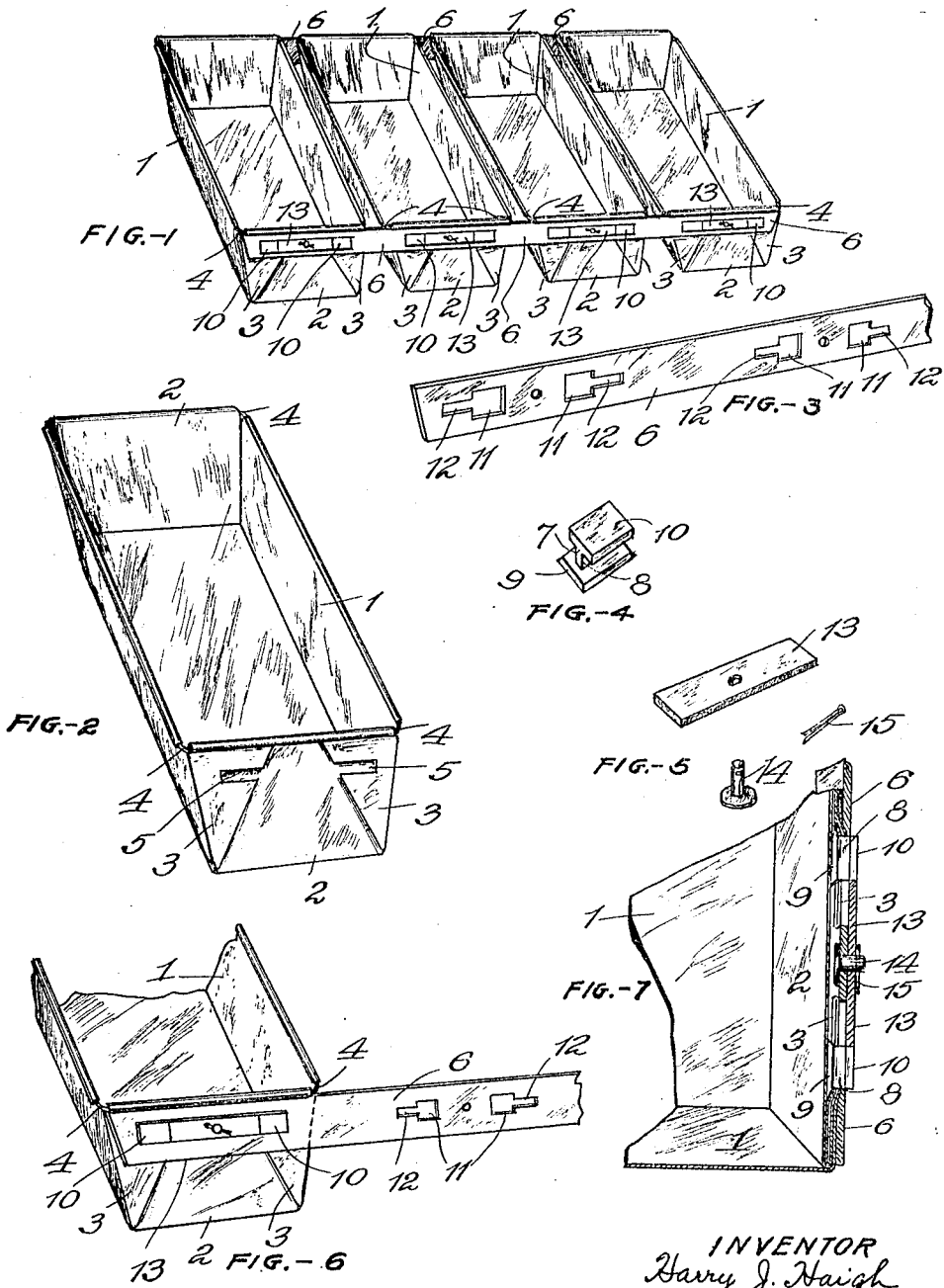

HARRY J. HAIGH, OF NEW YORK, N. Y.

BAKING-PAN.

1,291,492.    Specification of Letters Patent.    Patented Jan. 14, 1919.

Application filed September 22, 1917. Serial No. 192,737.

*To all whom it may concern:*

Be it known that I, HARRY J. HAIGH, a citizen of the United States, and a resident of Stapleton, county of Richmond, city and State of New York, have invented certain new and useful Improvements in Baking-Pans, of which the following is a specification.

This invention relates to that class of baking pans in which a plurality of individual pans are connected together to form a multiple pan, or a set of pans adapted to be handled as a unit, and it is especially applicable to baking pans for use in bakeries where the pans must be rigidly held together to withstand severe usage.

The principal object of the invention is to provide simple means for detachably connecting the individual pans together, whereby a damaged or worn pan may be removed from the set and a new pan substituted therefor, or the relative positions of the pans of a set changed to present a different pan or pan surface at the point or points of greatest wear.

Another object of the invention is to provide simple, light and inexpensive means for rigidly and detachably holding the individual pans together in spaced relation, so that a free circulation of heated air between the pans will be permitted, without the use of rivets or other fastening devices projecting within the pans, thus avoiding the formation of marks on the articles baked in the pans and the unsanitary conditions resulting from the presence of rivet heads or other projections on the interior of the pan.

A further important object of the invention is to provide a knock-down multiple pan in which the individual pans may be of standard construction and adapted to be detachably and interchangeably held together by a standard form of connecting means.

Another important object of the invention is to provide means held to the corner folds at the end walls of the pans adapted to be detachably secured to the pan connecting means for rigidly holding the pans against relative movement in any direction.

A further object of the invention is to provide a multiple pan comprising individual pans and connecting devices in which all of the parts are of standard construction, and in which removable devices supported by the corner folds of the pan are provided which are adapted to be detachably interlocked with connecting bars extending along the end walls of the pans.

In the drawings, Figure 1 is a perspective view of a multiple baking pan embodying the invention;

Fig. 2 a perspective view of one of the individual pans with the connecting devices removed;

Fig. 3 a fragmentary perspective view, showing a portion of one of the pan-connecting bars;

Fig. 4 a detail perspective view of one of the lugs or connecting devices which are supported by the end folds of the pan;

Fig. 5 a detail view showing the devices employed for detachably holding the connecting bars in place;

Fig. 6 a fragmentary perspective view, showing a portion of one of the end pans with the end of one of the connecting bars attached thereto; and Fig. 7 a fragmentary horizontal sectional view of one of the pans.

Referring to the drawings by numerals, the multiple pan comprises a series of individual pans 1, arranged side by side in spaced relation. In Fig. 1, I have shown four individual pans connected together to form a multiple pan, but it will be understood that any desired number of individual pans may be connected together. Each of the pans 1 is pressed from a sheet metal blank, and the surplus metal at the corners of the pan is bent flatly against the end walls 2, forming substantially V-shaped end or corner folds 3 at each side of the end walls of the pan. The pans are each provided with a beaded upper edge formed by bending the edges of the side and end walls of the pan outwardly and downwardly around a rectangular wire reinforcing frame 4. The corner folds 3 are provided with slots 5, extending horizontally from the inner edges of the folds.

The individual pans 1 are rigidly held in spaced relation by connecting bars 6, which extend along the end walls of the individual pans. The connecting bars 6 are held to the pans by means of interlocking connecting devices or lugs 7, which are removably supported at the ends of the pans 1 by the corner folds 3. The connecting devices or lugs 7 are each formed with a web portion 8, connecting a base portion 9 with the head 10.

To assemble the multiple pan the heads 10 of the connecting devices or lugs 7 are passed through the enlarged portions 11 of a series of apertures formed in the connecting bars 6, and the lugs 7 are then forced laterally to place the web portions 8 thereof in the horizontally extending slots 5 in the end folds 3 of the pans, and into the reduced portions 12 of the apertures in the connecting bars 6, which are so disposed as to register with the slots 5 in the end folds 3. This lateral movement of the lugs 7 confines the base portions 9 thereof between the corner folds 3 and the outer surface of the end walls 2, and as the enlarged heads 10 of the lugs are shifted over the reduced portions 12 of the apertures in the connecting bars, it will be seen that the connecting bars are securely held against the ends of the pans.

To prevent accidental disconnection of the bars 6, plates 13 are secured to the outer sides of the bars 6 between each pair of lugs 7 after the lugs have been shifted laterally into the registering slots 5 and 12. The ends of the plates 13 engage against the adjacent faces of the lugs 7 and hold the lugs against movement toward each other. The plates 13 are detachably held to the bars 6 by means of rivets 14 and cotter pins 15, or other suitable fastening devices.

From the foregoing it will be observed that simple, light, and inexpensive means has been provided for rigidly and detachably holding a series of pans in spaced relation so that an even circulation of heat about the individual pans is permitted; that a worn or damaged pan may be readily removed and a new pan substituted therefor, or the relative positions of the pans changed to present a different pan at the point of greatest wear; that the connecting devices are so constructed that the use of rivets or other fastening devices projecting within the pans is avoided; and that the individual pans and the several parts of the connecting means are of standard form and are readily detachable to permit a similar part or pan to be substituted for one that has been damaged.

What I claim is:

1. A multiple baking pan comprising a plurality of individual pans having corner folds lying against the exterior thereof, and coöperating sets of separably interlocked devices detachably held solely to the corner folds of said individual pans for separably locking the pans together against relative vertical and horizontal movement.

2. A multiple baking pan comprising a plurality of individual pans having corner folds lying against the end walls thereof, and means for detachably holding the pans in fixed relation with each other comprising rigid connecting members and devices shiftably held to said connecting members and movable relatively thereto into and out of interlocked relation with the corner folds of the pans.

3. The combination of a series of pans arranged in juxtaposition and having corner folds lying against the exterior thereof, means movable into and out of interlocked relation with the corner folds, rigid means detachably held to said movable means for maintaining the pans in fixed relation with each other, and releasable means for holding said movable means in interlocked relation with the corner folds.

4. The combination of a series of rectangular pans arranged side by side and having corner folds lying against the end walls thereof, connecting bars extending along the end walls of the series of pans, and means detachably interlocked both with said bars and the corner folds of the pans for holding the pans together.

5. The combination of a series of rectangular pans arranged side by side in spaced relation and having corner folds lying against the end walls thereof, connecting bars extending along the end walls of the series of pans, and removable devices interlocked both with the corner folds and said bars for holding the pans in spaced relation.

6. The combination of a series of rectangular pans arranged side by side in spaced relation and having corner folds lying against the end walls thereof formed with slots, connecting bars extending along the end walls of the series of pans and formed with a series of apertures, and means extending through said slots and apertures and shiftable therein to rigidly and detachably hold said bars to the pans.

7. The combination of a series of rectangular pans arranged side by side in spaced relation and having corner folds lying against the ends walls thereof formed with horizontally extending slots, connecting bars extending along the end walls of the pans and formed with a series of apertures having horizontally extending reduced portions, interlocking devices having reduced intermediate portions adapted to engage in said slots and the reduced portions of the apertures when shifted relatively to the bars and pans, and means for holding said devices in interlocked relation with the connecting bars and the corner folds of the pans.

8. An interchangeable pan unit for a knockdown multiple baking pan, comprising a rectangular metal pan formed with corner folds bent in pairs against the exterior of oppositely disposed walls of the pan, a part of each fold being spaced from the adjacent pan wall and slotted to adapt a headed device held to a pan connecting member to be detachably interlocked with the corner fold.

9. An interchangeable pan unit for a knockdown multiple pan, comprising a rectangular metal pan formed with corner folds bent in pairs against the exterior of the end walls thereof, the folds of each pair being provided with open-ended slots extending substantially horizontally from the adjacent inner edges of the folds, whereby pan connecting means may be separably interlocked with the corner folds of the pans.

10. The combination of a series of rectangular pans arranged side by side in a single row and each having corner folds bent in pairs against the exterior of oppositely disposed walls thereof, devices movable into and out of interlocked relation with the corner folds of said pans, rigid pan connecting members extending along opposite sides of the series of pans and detachably held to said movable devices, and shiftable locking means carried by said pan connecting members for releasably holding said movable devices in interlocked relation with the corner folds and releasably holding said connecting members to said movable devices.

This specification signed this 20th day of September A. D. 1917.

HARRY J. HAIGH.

Copies of this patent may be obtained for five cents each, by addressing the "Commissioner of Patents, Washington, D. C."